(12) United States Patent
Ohtsuka et al.

(10) Patent No.: US 8,292,514 B2
(45) Date of Patent: Oct. 23, 2012

(54) OPTICAL CONNECTING MEMBER AND METHOD OF FITTING THE SAME

(75) Inventors: Kenichiro Ohtsuka, Kanagawa (JP); Masaki Ohmura, Kanagawa (JP); Mitsuaki Tamura, Kanagawa (JP); Masahiro Hamada, Kanagawa (JP); Mitsuru Kihara, Tokyo (JP); Ryo Koayama, Tokyo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 104 days.

(21) Appl. No.: 12/744,202

(22) PCT Filed: Nov. 14, 2008

(86) PCT No.: PCT/JP2008/070818
§ 371 (c)(1), (2), (4) Date: Jul. 28, 2010

(87) PCT Pub. No.: WO2009/066625
PCT Pub. Date: May 28, 2009

(65) Prior Publication Data
US 2010/0284654 A1 Nov. 11, 2010

(30) Foreign Application Priority Data
Nov. 21, 2007 (JP) ................ P.2007-301851

(51) Int. Cl.
*G02B 6/38* (2006.01)
(52) U.S. Cl. .................. 385/65; 385/66; 385/69

(58) Field of Classification Search .......... 385/60–62, 385/65–72, 77–78, 83–86; 29/428
See application file for complete search history.

(56) References Cited

U.S. PATENT DOCUMENTS
2002/0114582 A1* 8/2002 Otera ................ 385/65

FOREIGN PATENT DOCUMENTS
| JP | 11-242136 A | 9/1999 |
| JP | 2005-345753 A | 12/2005 |
| JP | 2008-256738 A | 10/2008 |

* cited by examiner

*Primary Examiner* — Uyen Chau N Le
*Assistant Examiner* — Michael Mooney
(74) *Attorney, Agent, or Firm* — Global IP Counselors, LLP (57) ABSTRACT

To provide an optical connecting member capable of positioning and connecting a coated fiber by a simple connecting work with high precision, and a method of fitting the same. An optical connector 1 fitted onto an optical fiber 20 that has a coating 24 on an outer periphery of a glass fiber 21 has a ferrule 40 with a glass fiber insertion hole 42, a fixing portion 30 for fixing the optical fiber 20 that is inserted into the glass fiber insertion hole 42 and is abutted to the short optical fiber 41, an insertion port 42a which is a coating removing portion 10 for removing the coating 24 from an end portion of the optical fiber 20 by an insertion force applied the optical fiber 20 to an inner side of the optical connector 1, a deflection space 16 provided between the fixing portion 30 and the coating removing portion 10 to contain the optical fiber 20 in a deflected state therein, wherein a deflection preventing member 70 for preventing partially a deflection of the optical fiber 20 by shielding a part of an insertion direction of the optical fiber 20 in the deflection space 16 is detachably attached.

4 Claims, 12 Drawing Sheets

OPTICAL CONNECTING MEMBER AND METHOD OF FITTING THE SAME

TECHNICAL FIELD

The present invention relates to an optical connecting member fitted onto an optical fiber that has a coating on an outer periphery of a glass fiber, and a method of fitting the same.

BACKGROUND ART

As the optical connecting member, the optical connector that makes it possible to facilitate the work of fitting an optical connector onto an optical fiber on the worksite where an optical line is laid and thus shorten a working time has been known (see Patent Literature 1, for example). An example of the optical connector is shown in FIG. 12.

Figure 12:
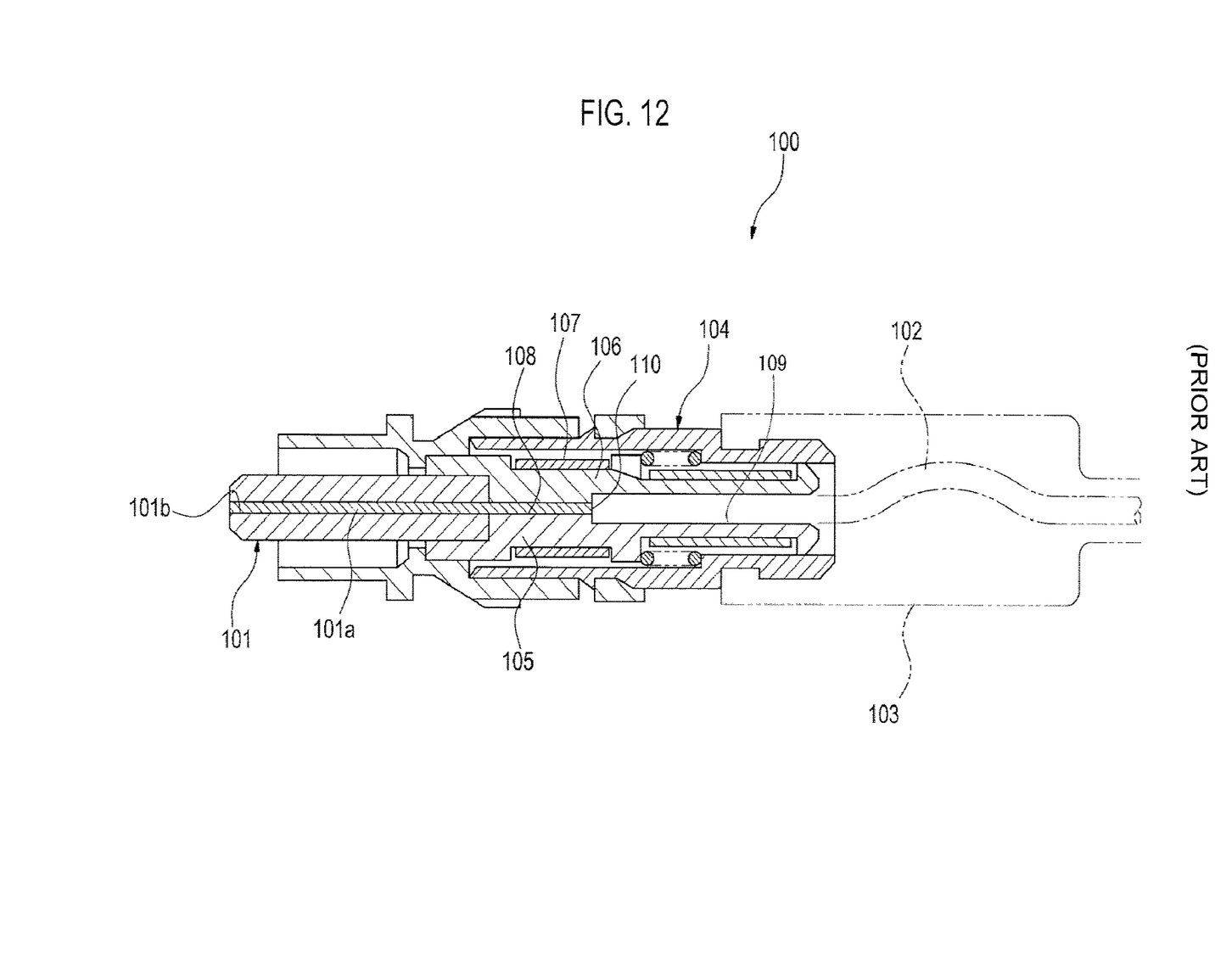
FIG. 12 is a sectional view showing an example of a conventional optical connector.

An optical connector 100 shown in FIG. 12 has a ferrule 101 in which a built-in optical fiber 101a as a glass fiber is built. The built-in optical fiber 101a is connected to a coated optical fiber 102 with coating in the inside of the optical connector 100. Also, a boot 103 for covering the coated optical fiber 102 that is extended backward is fitted to the rear portion of the optical connector 100. Also, an optical fiber holding hole 101b whose inner diameter is substantially identical to an outer diameter of the built-in optical fiber 101a is provided on a center axis of the ferrule 101. A rear end portion of the built-in optical fiber 101a is projected from the ferrule 101 by a predetermined length. The built-in optical fiber 101a is inserted into the optical fiber holding hole 101b, then positioned therein, and fixed by the adhesives. A rear end face of the built-in optical fiber 101a is connected to a front end face of a glass fiber (not shown) of the coated optical fiber 102 that is inserted into a splice member 104, which is provided at the back of the ferrule 101, from the backside.

The splice member 104 is constructed by a lower base member 105 and a cover member 106. The base member 105 and the cover member 106 are clamped integrally by a clamp member 107 that is formed of the elastic member to have a U-shaped sectional shape. A V-shaped groove 108 is provided in the center of an upper face of the base member 105. The built-in optical fiber 101a is fitted into the V-shaped groove 108, and then is positioned and held by the cover member 106. A V-shaped groove 109 is provided in a latter half portion of the splice member 104. The V-shaped groove 109 is used to position and fix the coated optical fiber 102 in the center of an upper face of the base member 105 on a basis of an outer peripheral face of the coating.

That is, the coated optical fiber 102 is fitted in the V-shaped groove 109, and then the coating is pressed with the cover member 106. Thus, the coated optical fiber 102 can be positioned and held. In this case, a refractive-index matching agent 110 is filled in a joining position between the built-in optical fiber 101a and the coated optical fiber 102 to achieve a low loss and a low reflection of the transmitted light on a joined face.

Patent Literature 1: Japanese Patent Application Publication JP-A-2005-345753

DISCLOSURE OF THE INVENTION

Problems that the Invention is to Solve

By the way, in case the Q-S connector in which the optical fiber is built previously in the ferrule, or the like is employed, the coating of the optical fiber is removed by a tool such as a stripper, then dusts are removed from the side surface of the optical fiber by using alcohol, or the like, then the optical fiber is cut by a tool such as a cutter, or the like, then the optical fiber is inserted carefully into the connector to come into contact with the built-in fiber, and then the optical fiber is fixed. In this manner, the connecting work is very troublesome.

In the foregoing optical connector 100, the coated optical fiber 102 that is connected to the built-in optical fiber 101a provided to the ferrule 101 is connected in a coated state. Therefore, this connecting approach has such advantages that there is no need to provide the step of removing the coating, etc. and the connecting work that is done on the worksite is made simple. However, the coated optical fiber 102 is positioned on a basis of an outer peripheral surface of the coating in this approach. Therefore, it is feared that an optical axis is displaced at the connecting location due to deformation of the coating and thus a connection loss is caused.

Therefore, it is an object of the present invention to provide an optical connecting member capable of positioning/connecting a coated fiber by a simple connecting work with high precision, and a method of fitting the same.

Means for Solving the Problems

An optical connecting member which can solve the above problem is an optical connecting member fitted onto an optical fiber that has a coating on an outer periphery of a glass fiber, comprising:

a connecting portion with a glass fiber insertion hole;

a fixing portion for fixing the optical fiber that is inserted into the glass fiber insertion hole;

a coating removing portion for removing the coating from an end portion of the optical fiber by an insertion force applied the optical fiber to an inner side of the optical connecting member; and a deflection space provided between the fixing portion and the coating removing portion to contain the optical fiber in a deflected state therein;

wherein a deflection preventing member for preventing partially a deflection of the optical fiber by shielding a part of an insertion direction of the optical fiber in the deflection space is detachably attached.

In the optical connecting member according to the invention, the deflection preventing member covers a guide groove that is provided in the deflection space to pass the optical fiber therethrough.

Further, in the optical connecting member according to the invention, a releasing portion, which allows the optical fiber inserted into the deflection space to deflect, is provided to the deflection preventing member in an intermediate portion in an insertion direction of the optical fiber.

An optical connecting member fitting method which can solve the above problem is an optical connecting member fitting method of fitting the optical connecting member set forth in any one of claims 1 to 3 to an optical fiber, comprising:

forming an insertion path of the optical fiber in a state that the deflection space is shield partially by the deflection preventing member;

inserting the optical fiber into the insertion path in the optical connecting member;

pushing further the optical fiber by pushing a top end of the inserted optical fiber against the coating removing portion such that the optical fiber is deflected at a part of the insertion direction of the optical fiber in the deflection space and also a coating of the top end of the optical fiber is removed by the coating removing portion and then the glass fiber is inserted into the glass fiber insertion hole; and pulling out the deflection preventing member from the deflection space, then causing the optical fiber to bend in a full range in the insertion direction of the optical fiber in the deflection space, and then fixing the optical fiber by the fixing portion.

Advantages of the Invention

According to the present invention, upon inserting the optical fiber that has the coating on the outer periphery of the glass fiber into the optical connecting member, the coating can be removed from the end portion of the optical fiber by the coating removing portion, then the glass fiber exposed from the end portion can be inserted into the glass-fiber insertion hole of the connecting portion, and then the optical fiber can be fixed by the fixing portion. There is no necessity to execute the coating removing work prior to the insertion of the optical connecting member, and also the coated optical fiber can be positioned in the connecting portion with high precision on a basis of the outer periphery of the glass fiber and can be connected to other optical fiber, or the like.

Also, upon inserting the optical fiber into the optical connecting member, the deflection preventing member for shielding a part of the deflection space is inserted. Therefore, a strong pushing force can be applied to the top end of the optical fiber by bending the optical fiber at a part of the deflection space, and the optical fiber can be pushed against the coating removing portion. As a result, the coating can be removed without fail.

Also, after the removal of the coating, the optical fiber is fixed by the fixing portion while deflecting the optical fiber in the deflection space such that the top end of the glass fiber is pushed against the built-in glass fiber, or the like by a predetermined pushing force. Therefore, the optical fiber can be connected without fail.

DESCRIPTION OF REFERENCE NUMERALS

1: optical connecting member, 10: coating removing portion, 16: deflection space, 20: optical fiber, 21: glass fiber, 24: coating, 30: fixing portion, 40: ferrule (connecting portion), 42: glass fiber insertion hole, 65 V-shaped groove (guide groove), 70: deflection preventing member, 71: releasing portion, 73: insertion path

BEST MODE FOR CARRYING OUT THE INVENTION

An example of embodiments of an optical connecting member and a method of fitting the same according to the present invention will be explained with reference to the drawings hereinafter.

Figure 1:
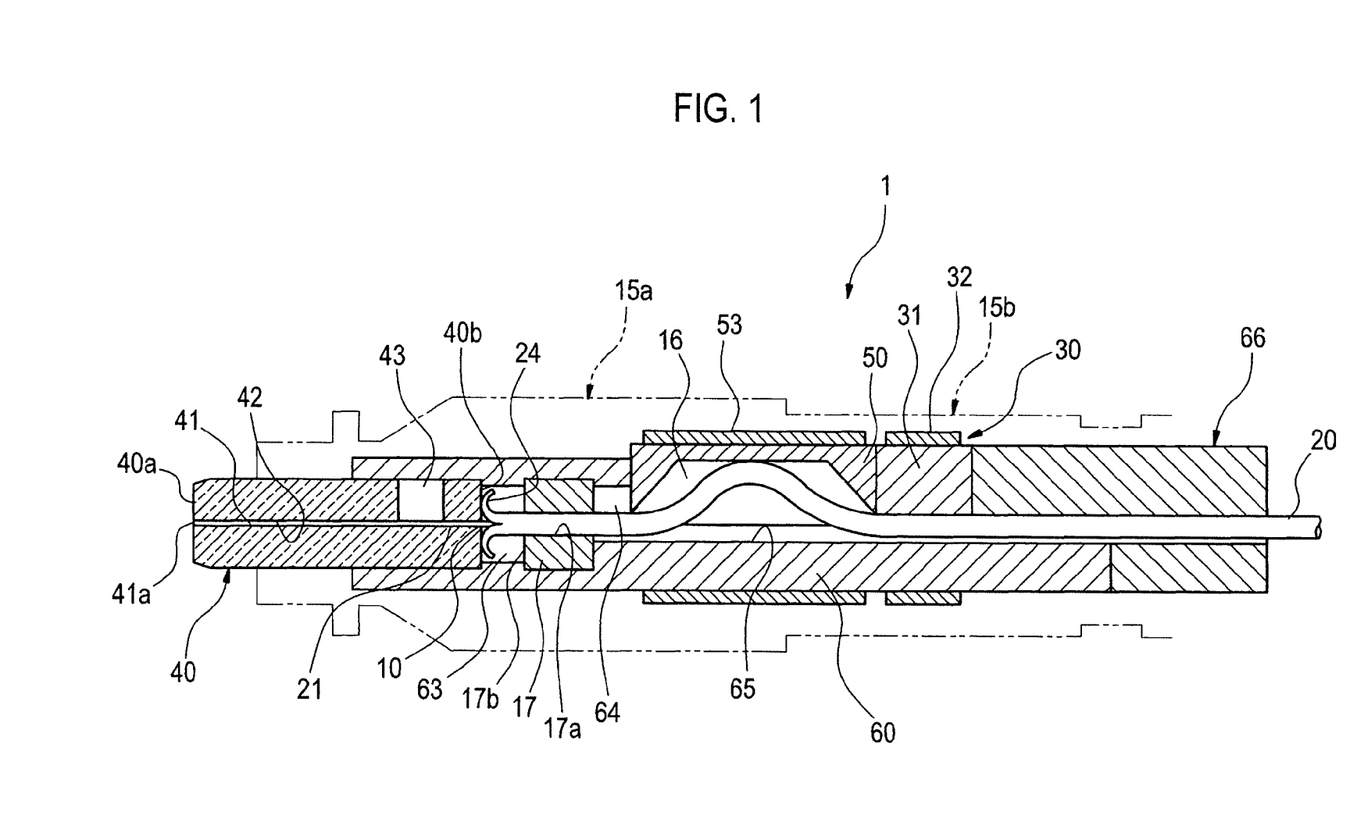
FIG. 1 is a sectional view after an optical connector as an optical connecting member according to an embodiment of the present invention is fitted.
Figure 2:
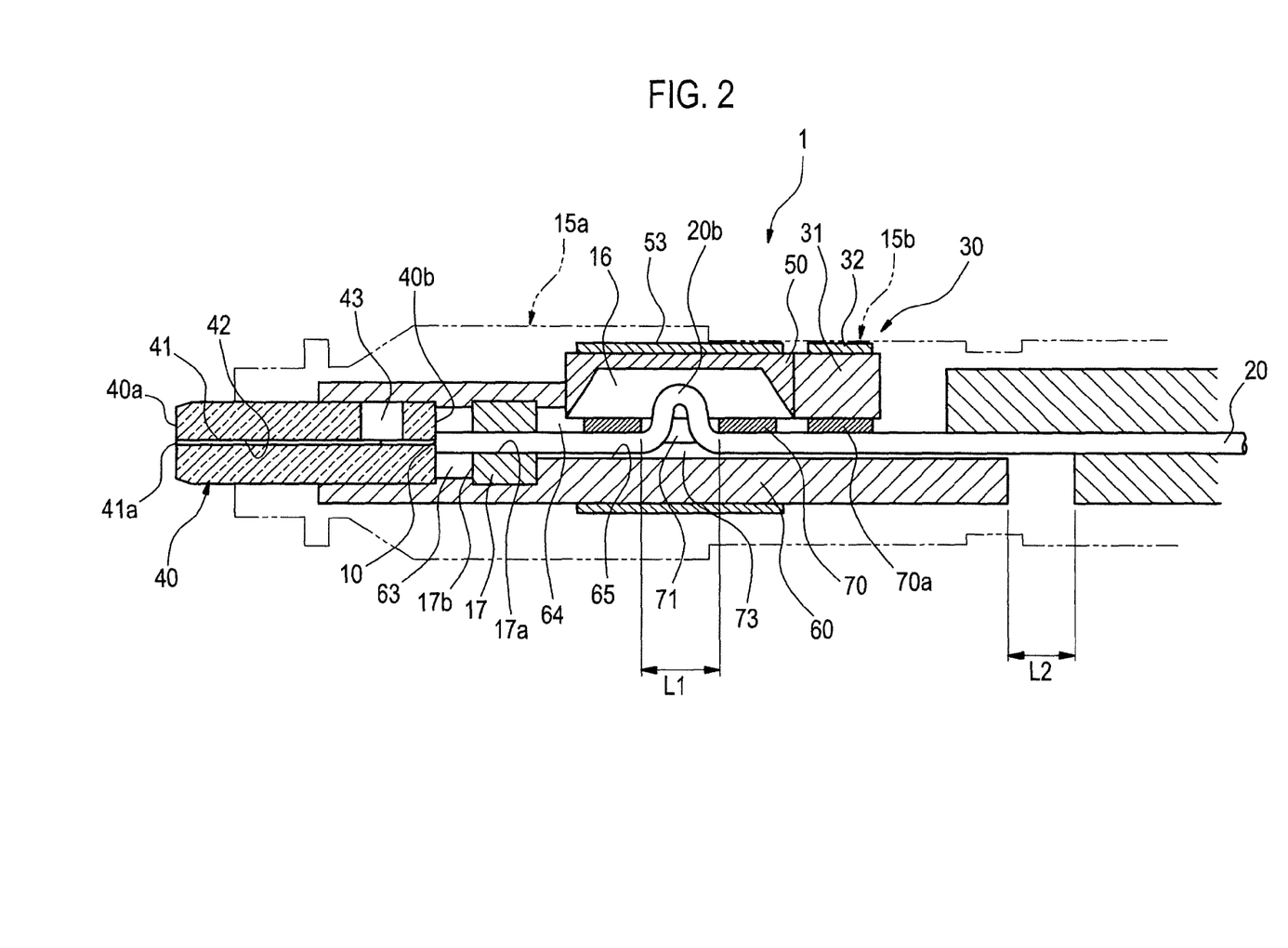
FIG. 2 is a sectional view of the optical connector when a coating is removed.
Figure 3:
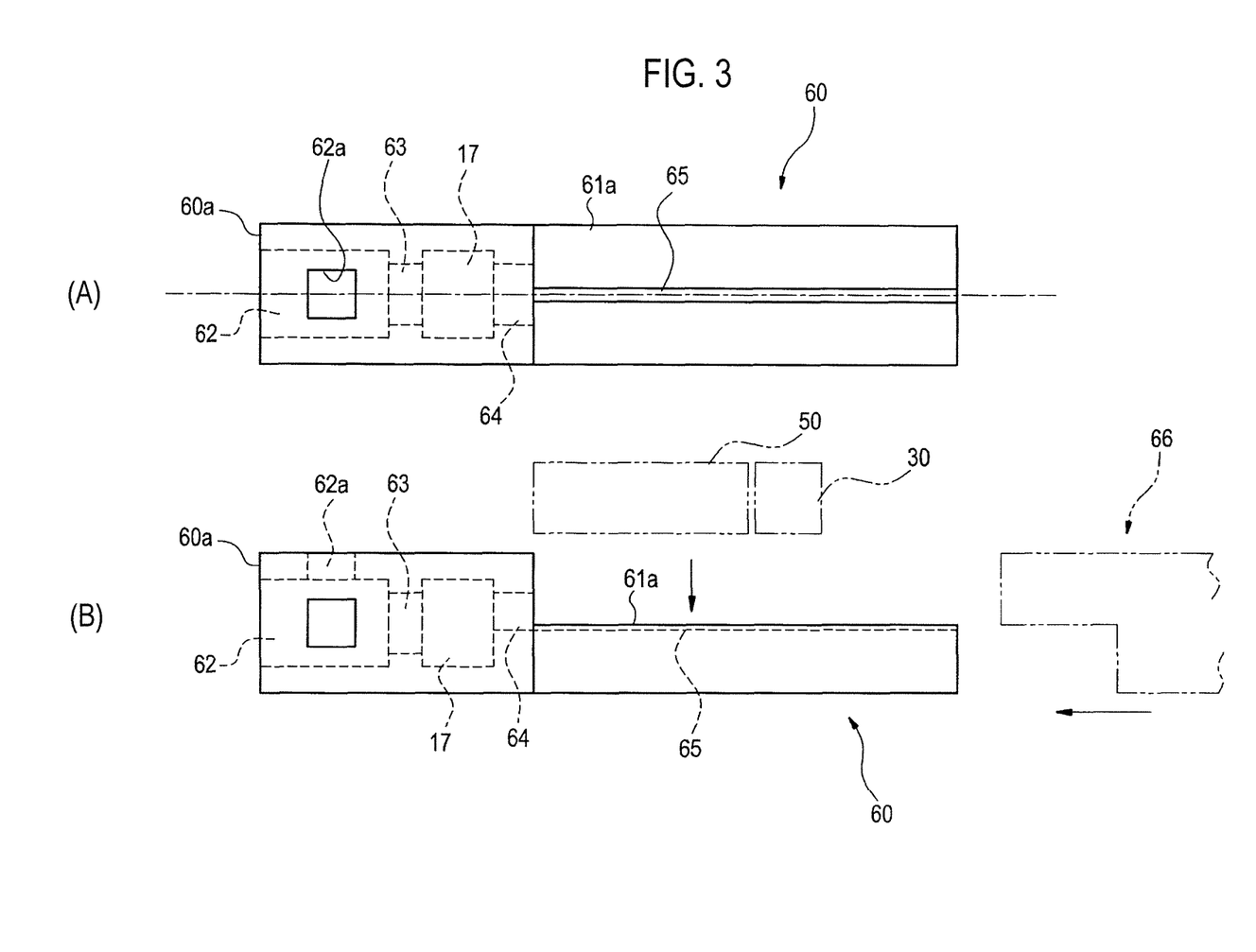
FIG. 3 is a base member provided to the optical connector in FIG. 1, where FIG. 3 (A) is a plan view, and FIG. 3 (B) is a side view.

FIG. 1 is a sectional view after an optical connector as an optical connecting member according to an embodiment of the present invention is fitted, FIG. 2 is a sectional view of the optical connector when a coating is removed, and FIG. 3 is a base member provided to the optical connector in FIG. 1, where FIG. 3(A) is a plan view, and FIG. 3(B) is a side view.

As shown in FIG. 1 and FIG. 2, an optical connector 1 as an optical connecting member of the present embodiment is the optical connector that can be fitted to a coated optical fiber 20 on the worksite. A ferrule 40 as a connecting portion having a glass fiber insertion hole 42 is provided on the top end side of the optical connector 1 (on the left end side in FIG. 1). A coating removing portion 10 for removing a coating 24 from the end portion of the coated optical fiber 20 by means of an insertion force, which is applied to the coated optical fiber 20 toward the inner side of the optical connector 1, is provided on the rear end portion of the ferrule 40 (on the right end side in FIG. 1). Also, a fixing portion 30 for fixing the coated optical fiber 20 being inserted into the glass fiber insertion hole 42 is provided to the rear portion of the optical connector 1. A deflection space 16 that can contain the optical fiber 20 in its bent state is provided between the fixing portion 30 and the coating removing portion 10. Then, a deflection preventing member 70 for preventing partially the deflection of the optical fiber 20 by shielding a part of the insertion direction of the optical fiber 20 in the deflection space 16 is inserted in the deflection space 16 and provided detachably.

As shown in FIG. 3, a base member 60 of the optical connector 1 is shaped wholly into a rectangular prism, for example. An upper half portion (an upper half portion in FIG. 3(B)) of the base member 60 is cut away like a flat plane from the center portion to the rear portion (the right side portion in FIG. 3) to constitute an intermediate face 61a. A V-shaped groove 65 as a guide groove used to position the coated optical fiber 20 is formed along the inserting direction of the optical fiber 20 in the center of the intermediate face 61a in the width direction. Also, a lid member 50 used to form the deflection space 16 and a lid 31 of the fixing portion 30 are fitted to the intermediate face 61a from the top.

Meanwhile, a ferrule fitting hole 62 is formed to the front end portion (the left end portion in FIG. 3) of the base member 60 from a front end face 60a of the base member 60 to the center. A notch 62a that is opened to the upper surface of the base member 60 is provided to the upper side of the ferrule fitting hole 62. Also, a guide capillary 17 is built in the center side (the right side in FIG. 3) of the ferrule fitting hole 62 via a coating removing space 63. A space 64 is provided between the guide capillary 17 and the intermediate face 61a.

Figure 4:
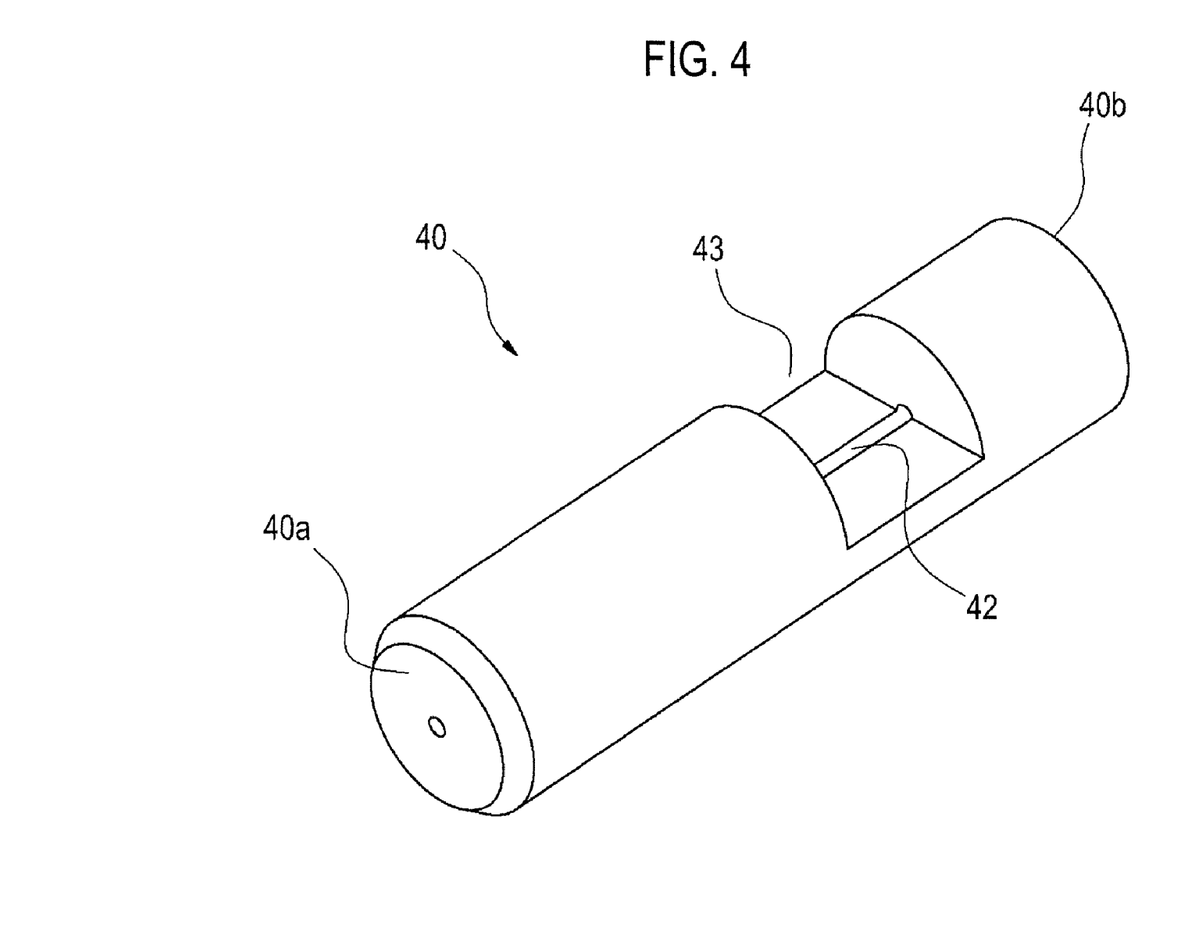
FIG. 4 is a perspective view of a ferrule

FIG. 4 is a perspective view of the ferrule, FIG. 5(A) is a sectional view of the ferrule, FIG. 5(B) is a sectional view taken along a B-B line in FIG. 5(A), and FIG. 5(C) is a sectional view taken along a C-C line in FIG. 5(A).

Figure 5:
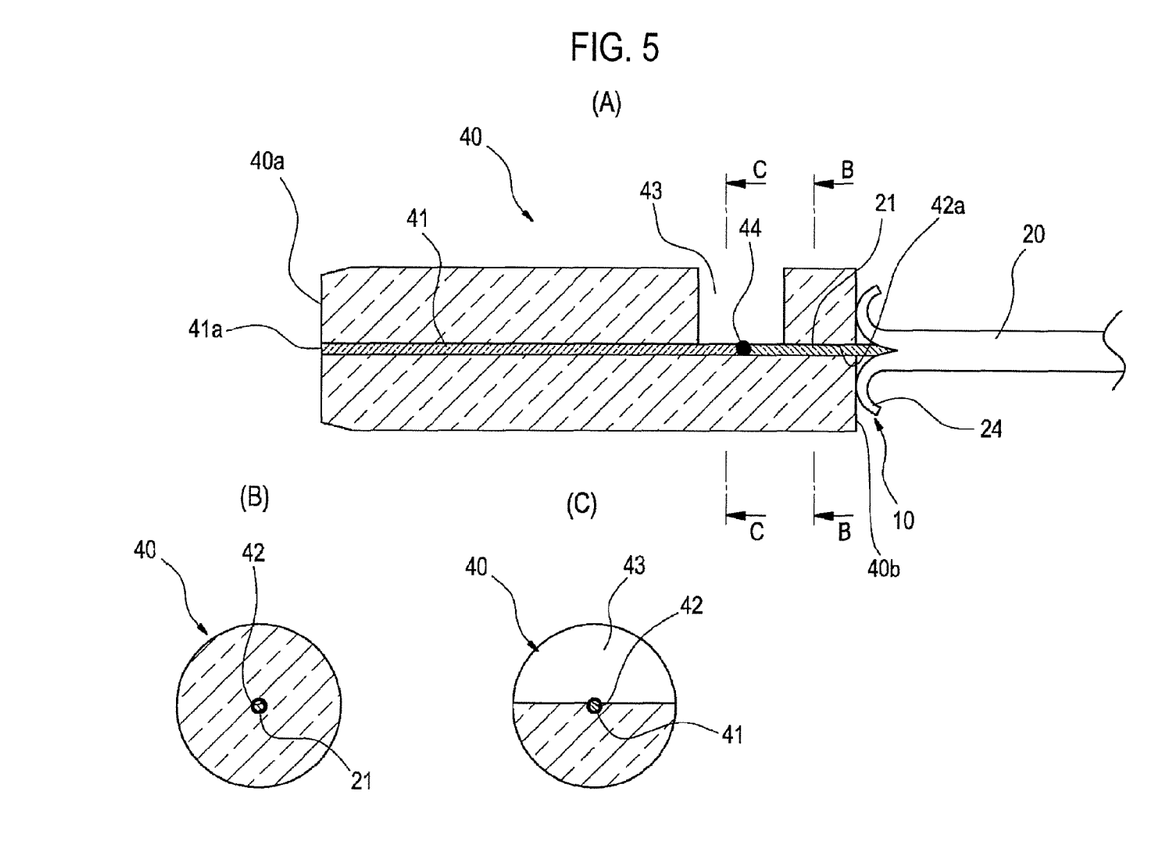
FIG. 5(A) is a sectional view of the ferrule.
FIG. 5(B) is a sectional view taken along a B-B line in FIG. 5(A)
FIG. 5(C) is a sectional view taken along a C-C line in FIG. 5(A).

As shown in FIG. 4 and FIG. 5, the ferrule 40 is the member that is shaped into a substantial circular column The glass fiber insertion hole 42 whose inner diameter D1 (see FIG. 6) is larger slightly than an outer diameter d3 of a glass fiber 21 is provided to a center of the ferrule 40 along the axial direction. A short optical fiber 41 as an optical member is provided to the top end side of the glass fiber insertion hole 42.

Also, a notch 43 is provided near the rear portion of the ferrule 40, and the glass fiber insertion hole 42 is exposed from there. As shown in FIG. 5(C), the glass fiber insertion hole 42 in the notch 43 has a size (a "C"-shaped sectional shape) that covers at least a half of the short optical fiber 41 and the glass fiber 21. When the ferrule 40 is fitted into the ferrule fitting hole 62 of the base member 60, this notch 43 is positioned below the notch 62a provided to the base member 60. Therefore, the glass fiber insertion hole 42 can be viewed from the outside via the notches 43, 62a. Also, as shown in FIGS, the short optical fiber 41 as the optical member is the uncoated glass fiber. A front end face 41a of the short optical fiber 41 is aligned with a top end face 40a of the ferrule 40, then the short optical fiber 41 is inserted into the glass fiber insertion hole 42 such that the rear end face is exposed from the notch 43, and then this short optical fiber 41 is fixed by the adhesives.

That is, a butt connected face of the short optical fiber 41 and the glass fiber 21 is exposed from the notch 43 and the notch 62a. Therefore, a refractive-index matching member 44 can be put easily into the connected face. Accordingly, a low loss and a low reflection of the transmitted light on the connected face can be achieved. Also, the notches 43, 62a can release an air when the glass fiber 21 is inserted into the glass fiber insertion hole 42 and is pushed against the short optical fiber 41. Therefore, a reaction force applied to compress an air is not generated, and the glass fiber can be connected smoothly. Here, as shown in FIG. 1, the ferrule 40 is fitted into the ferrule fitting hole 62 at the front end, and the top ends of the ferrule 40 and the base member 60 are housed in a front housing 15a.

Figure 6:
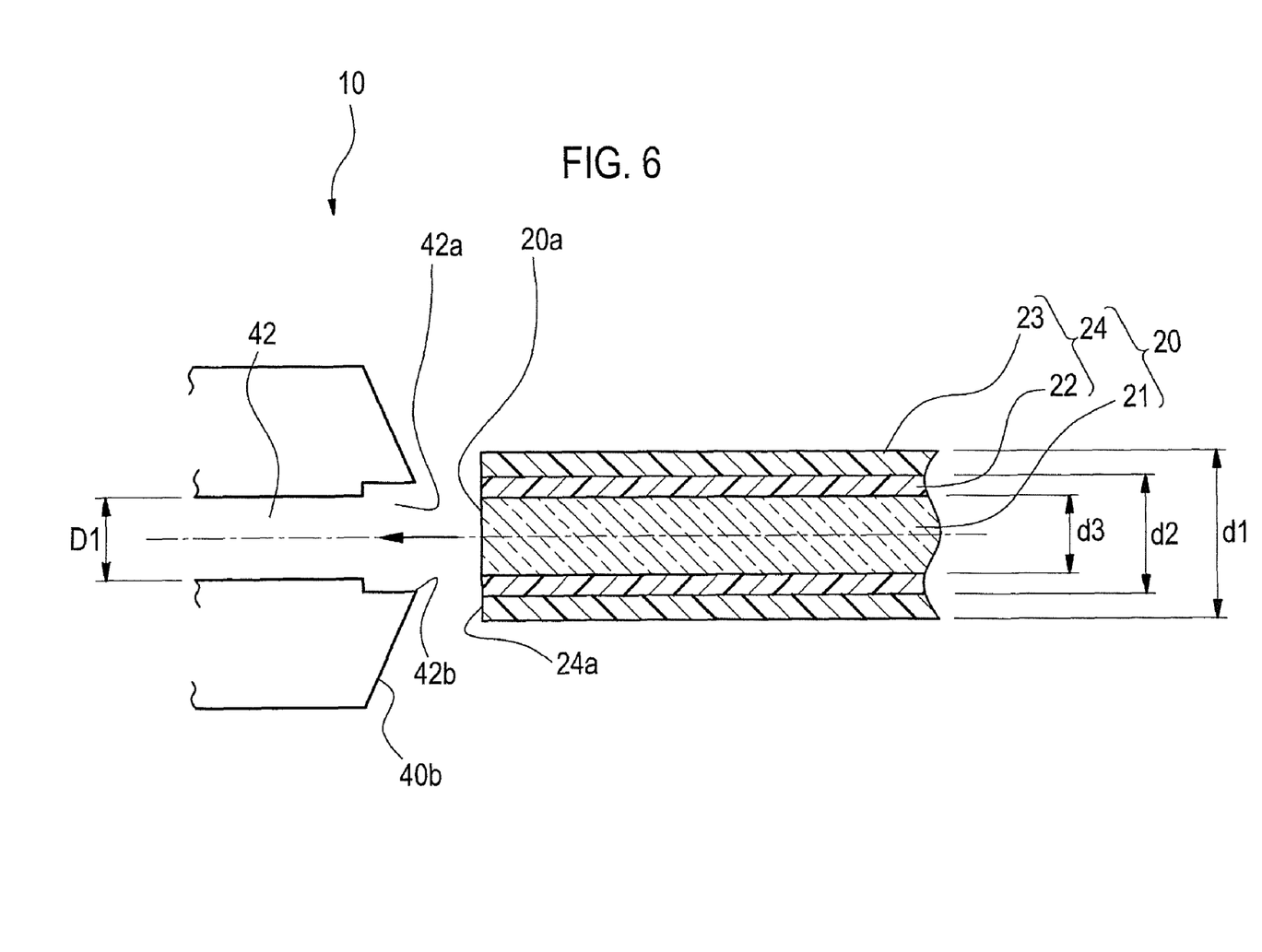
FIG. 6 is an enlarged sectional view of a coating removing portion.

FIG. 6 is an enlarged sectional view of the coating removing portion. As shown in FIG. 6, an insertion port 42a of the glass fiber insertion hole 42 on a rear end face 40b of the ferrule 40 is constructed as the coating removing portion 10. When the coating removing portion 10 is pushed against an end face 24a of the coating 24 at an end face 20a of the optical fiber 20 that has the coating 24 on the outer periphery of the glass fiber 21, this coating removing portion 10 acts to strip off/remove the coating 24 from the glass fiber 21.

The optical fiber 20 has the glass fiber 21 whose outer diameter d3=125 μm, for example, in the center. The coating 24 whose outer diameter d1=250 μm is provided to coat the outer periphery of the glass fiber 21. The glass fiber 21 is the glass fiber having a core and one cladding layer, or more. The glass fiber such as a single mode fiber, a multi-mode fiber, or the like, which has any refractive index distribution, can be applied.

Also, in FIG. 6, the coating 24 has a first coating layer 22 provided in the innermost layer to contact the glass fiber 21 and having an outer diameter d2, and a second coating layer 23 as the outer coating to coat the outside of the first coating layer 22. But the configuration of the coating 24 is not limited to this configuration, and one-layered structure or two-layered or more structure may be employed. Also, a coloring layer may be provided on the outermost layer.

Here, a resin constituting the coating 24 is an ultraviolet curable resin such as urethane acrylate, or the like, and the physical properties such as an elastic modulus, and the like are set adequately by additives. For example, it is preferable that an elastic modulus of the first coating layer 22 that contacts the glass fiber 21 should be set lower (i.e., soft) than the second coating layer 23.

The glass fiber insertion hole 42 can be shaped into a space such as a round hole, a square hole, a regular polygonal hole, or the like, or a V-shaped groove, for example. The case of the round hole will be explained as the preferred example herein. In the case of the round hole, a force is easily applied uniformly in the circumferential direction of the optical fiber 20, and a coating removing property is excellent. The inner diameter D1 of the glass fiber insertion hole 42 is larger than the outer diameter d3 of the glass fiber 21 of the optical fiber 20, but is smaller than the outer diameter d1 (i.e., the outer diameter of the optical fiber 20) of the coating 24. Therefore, when the end face 20a of the optical fiber 20 is pushed against to the surrounding of the glass fiber insertion hole 42 of the ferrule 40, a top end portion 42b of the insertion port 42a of the glass fiber insertion hole 42 comes into contact with the end face 24a of the coating 24 but does not come into contact with the glass fiber 21.

Also, it is desirable that the inner diameter of the top end portion 42b of the glass fiber insertion hole 42 should be set smaller than the outer diameter d2 of the first coating layer 22 constituting the coating 24 but larger than the outer diameter d3 of the glass fiber 21. Accordingly, when the end face 20a of the optical fiber 20 is pushed against the surrounding of the glass fiber insertion hole 42, the top end portion 42b comes into contact with the first coating layer 22, so that a force of striping off from the glass fiber 21 can be applied directly the first coating layer 22, and a removing property can be improved. When the end face of the optical fiber 20 is pushed against to the surrounding of the insertion port 42a of the ferrule 40, the surrounding of the insertion port 42a of the ferrule 40 comes into contact with the end face 24a of the coating 24 but does not come into contact with the glass fiber 21. As a result, only the glass fiber 21 can be inserted into the glass fiber insertion hole 42.

According to such configuration, the coating 24 can be removed simultaneously in inserting the glass fiber 21 into the ferrule 40. Therefore, the works that are done on the worksite can be simplified. The rear end face 40b of the ferrule 40 shown in FIG. 6 is inclined such that removal of the coating should be made easy and the stripped-off coating 24 should be moved easily to the outer side.

The guide capillary 17 for restricting a movement of the optical fiber 20 in the radial direction is provided between the coating removing portion 10 and the deflection space 16. A positioning hole 17a whose inner diameter is larger slightly than the outer diameter of the optical fiber 20 with the coating 24 is provided to the guide capillary 17. This positioning hole 17a can position the deflected optical fiber 20 on the path line and guide precisely the top end of the optical fiber 20 to the coating removing portion 10. In this case, when a distance between a top end face 17b of the guide capillary 17 and the rear end face 40b of the ferrule 40 as the coating removing portion 10 (i.e., a length of the coating removing space 63) is set shorter (e.g., about 0.5 mm to 1.0 mm), the glass fiber 21 can be guided more precisely to the glass fiber insertion hole 42 of the ferrule 40. But the coating removing space 63 must be set in size to house the removed coating 24 therein.

Also, as shown in FIG. 1 to FIG. 3, the fixing portion 30 is provided to the rear portion of the base member 60. The fixing portion 30 has the lid 31, and the coated optical fiber 20 is fixed by pushing the lid 31 against the intermediate face 61a of the base member 60 by means of a fixed-portion clamper 32. The V-shaped groove 65 is provided similarly in the position of the base member 60 corresponding to the fixing portion 30, and the optical fiber 20 when pressed by the lid 31 is fixed in the predetermined position (path line). Upon inserting the optical fiber 20, a space of the insertion path can be ensured between the intermediate face 61a and the lid 31 by inserting in advance a plate-like member 70a between the intermediate face 61a and the lid 31. The rear portions of the fixing portion 30 and the base member 60 are housed in a rear housing 15b.

As shown in FIG. 1 and FIG. 2, the lid member 50 having the deflection space 16 that can contain the optical fiber 20 in its deflected state is provided between the fixing portion 30 and the coating removing portion 10. In other words, when the portion of the optical fiber 20 having the coating 24 is housed in the deflection space 16 in its deflected state at the back of the glass fiber 21 being inserted into the ferrule 40 and then the optical fiber 20 is fixed in the fixing portion 30, a resilient energizing force toward the connected face of the short optical fiber 41 being built in the ferrule 40 is applied to the top end face of the glass fiber 21, which is inserted into the glass fiber insertion hole 42 of the ferrule 40. Therefore, the connected state between the short optical fiber 41 and the optical fiber 20 is stably maintained.

Figure 7:
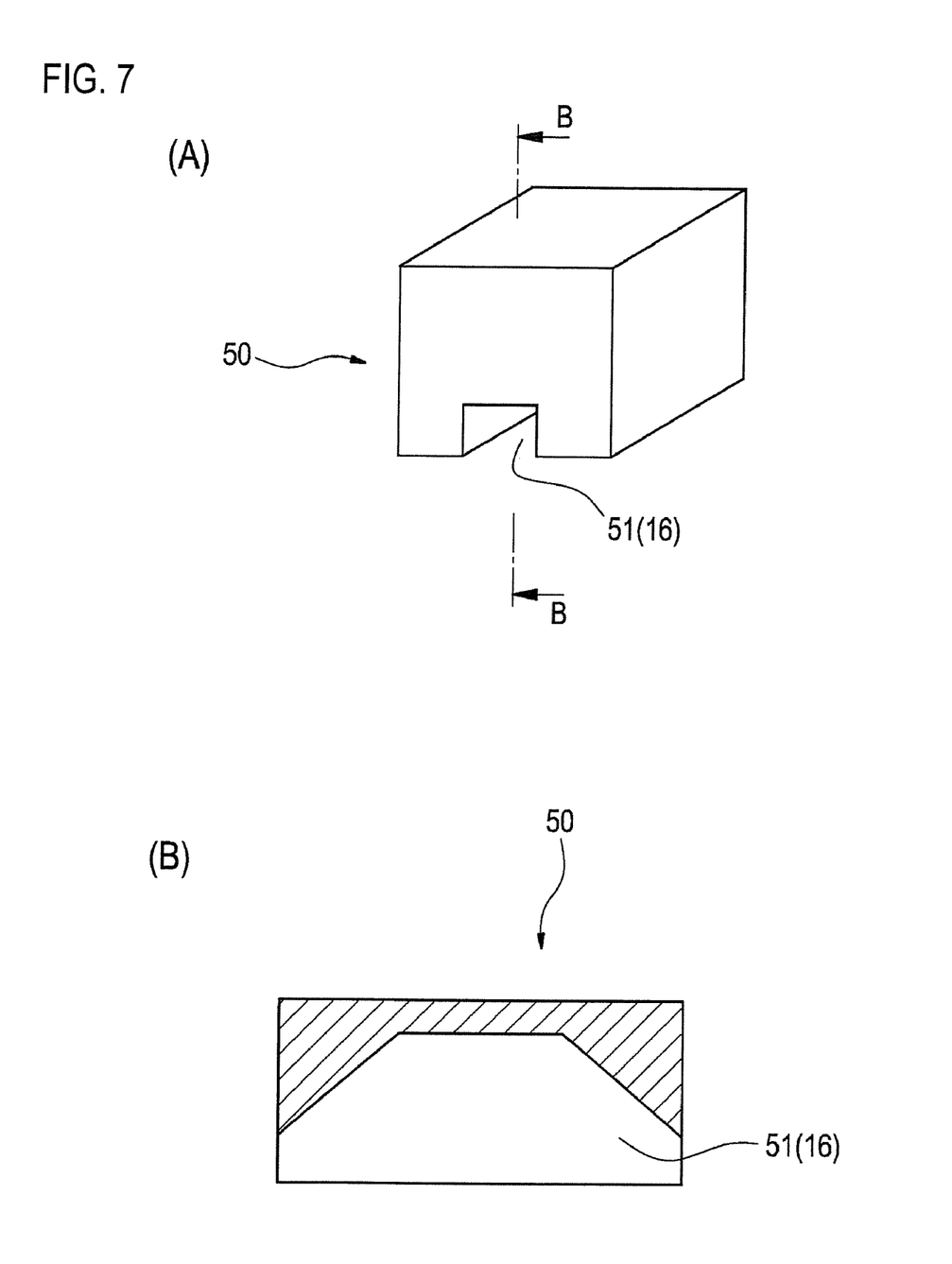
FIG. 7(A) is a perspective view of a lid member to form a deflection space.
FIG. 7(B) is a sectional view taken along a B-B line in FIG. 7(A).

FIG. 7(A) is a perspective view of the lid member to form a deflection space, FIG. 7(B) is a sectional view taken along a B-B line in FIG. 7(A), FIG. 8(A) is a plan view of the deflection preventing member, and FIG. 8(B) is a side view when viewed from a B direction in FIG. 8(A).

The deflection space 16 can be formed by fitting the lid member 50 shown in FIG. 7(A) to the intermediate face 61a that is formed by cutting away a part of the base member 60. The lid member 50 is a block member that is shaped substantially into a rectangular parallelepiped as a whole. A recess portion 51 that is opened upward from the center portion on the lower face is formed along the longitudinal direction of the base member 60. Thus, the deflection space 16 is formed to have a mountain shape such that the optical fiber 20 can be deflected upward when inserted therein. As shown in FIG. 7(B), a height of the recess portion 51 forming the deflection space 16 is set low at both the front and rear end portions and is set high in the center portion. The lid member 50 as well as the base member 60 is clamped and fixed by a clamper 53 after the fitting is completed.

Figure 8:
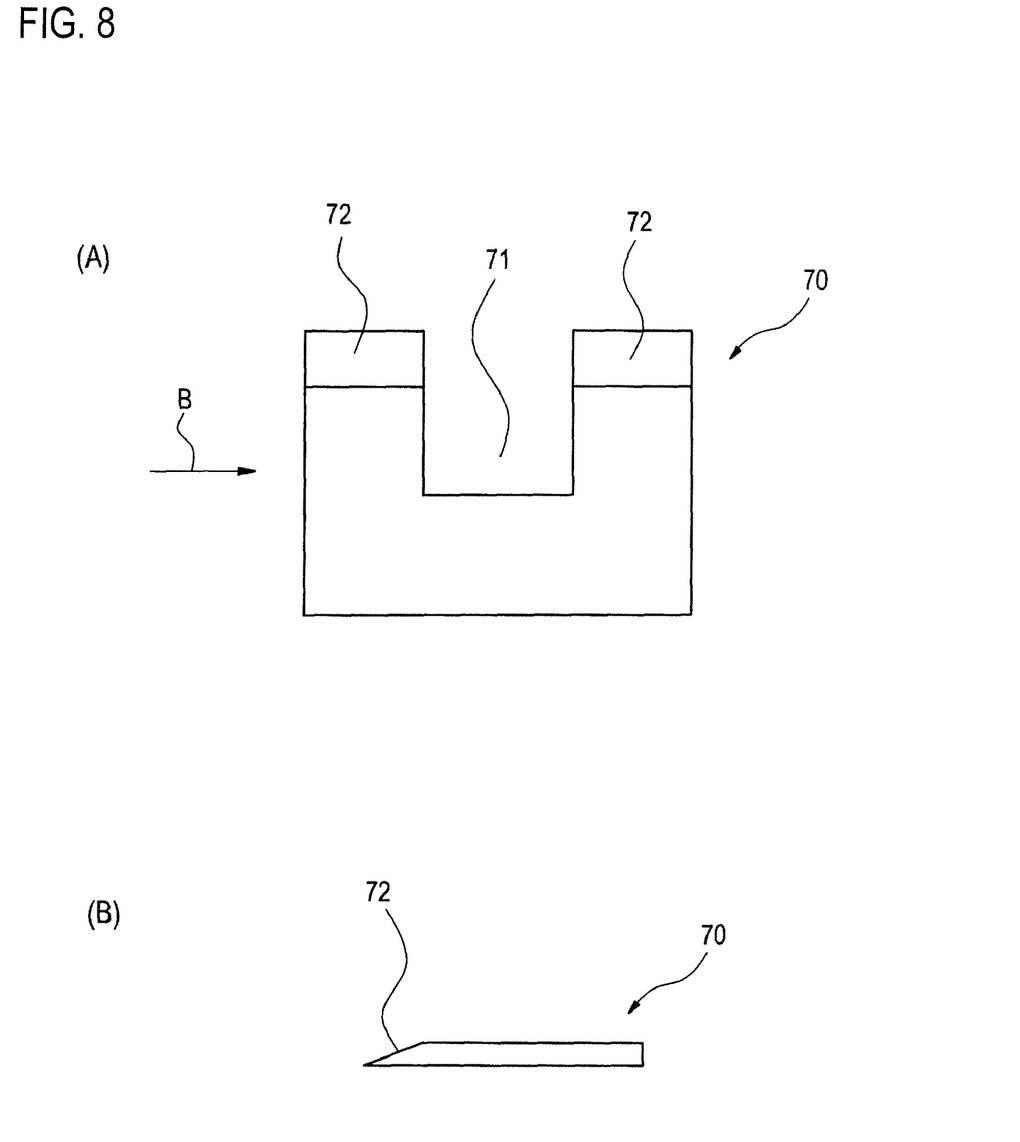
FIG. 8(A) is a plan view of a deflection preventing member.
FIG. 8(B) is a side view when viewed from a B direction in FIG. 8(A).

Here, as shown in FIG. 2, in removing the coating, the deflection preventing member 70 is inserted between the lid member 50 and the intermediate face 61a of the base member 60. This deflection preventing member 70 prevents partially the deflection of the optical fiber 20 by shielding a part of the insertion direction of the optical fiber 20 in the deflection space 16. As shown in FIG. 8, the deflection preventing member 70 is the plate-like member that is formed like a U-shape as a whole, and a releasing portion 71 is notched in the center portion. Also, an inclined face 72 is provided to the top end of the deflection preventing member 70 in the insertion direction to make easy the insertion of the optical fiber 20 between the lid member 50 and the intermediate face 61a.

As shown in FIG. 2, when the deflection preventing member 70 is inserted between the lid member 50 and the intermediate face 61a, the V-shaped groove 65 is covered in the front portion and the back portion of the lid member 50 in the insertion direction of the optical fiber. Thus, such a situation is prevented that the optical fiber 20 is deflected upward. Also, as shown in FIG. 2, the releasing portion 71 of length L1 is positioned on the V-shaped groove 65 in the middle portion of the deflection preventing member 70 in the insertion direction of the optical fiber. Thus, the optical fiber 20 is allowed to bend upward by a predetermined height, so that a preliminary deflection 20b can be formed. Also, when the optical fiber 20 is inserted, this optical fiber 20 is held by a holder 66 and also an interval L2 between the holder 66 and the base member 60 gives a push-in length of the optical fiber 20 in removing the coating 24. In this case, it is desirable that the lengths L1 and L2 should be set to give L1>L2.

Figure 9:
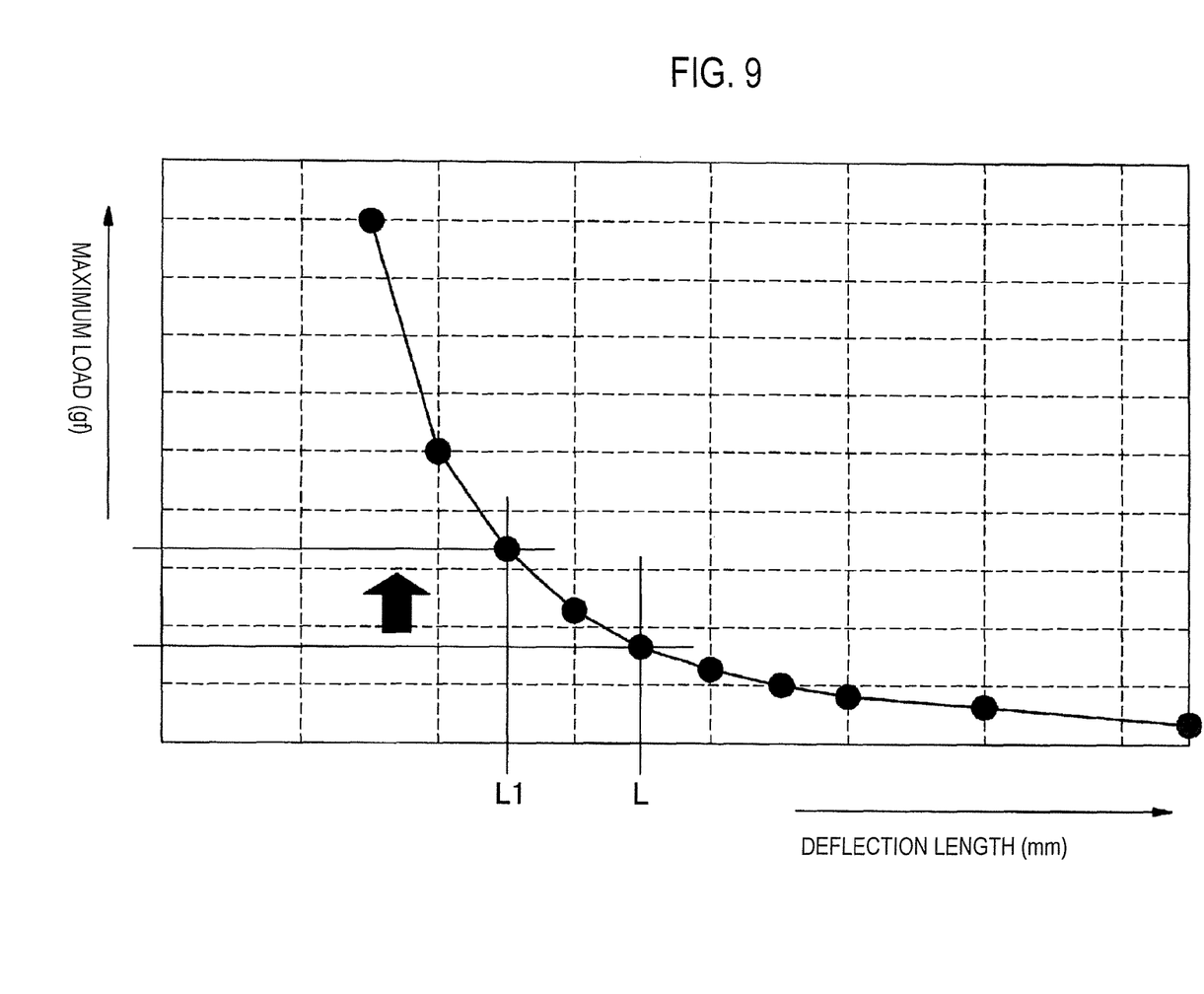
FIG. 9 is a graph showing a relationship between a deflection length and a bending load.

In a situation that a margin length (deflection length) L of the optical fiber 20 prior to the coating removal is set to L=L1+L2 in a state that the top end of the optical fiber 20 contacts the coating removing portion 10, when a length of movement (i.e., bent length) of the holder 66 is set to L by covering completely the V-shaped groove 65 in the deflection space 16, the optical fiber 20 of length L is bent at the rear end of the optical connector 1. In contrast, when the preliminary deflection of the optical fiber 20 is set in advance to the length L1 in the deflection space 16 and a length of movement L2 of the holder 66 is set to the length necessary for the removal of the coating, a push-in length of the optical fiber 20 upon removing the coating is set to L2. Therefore, as shown in FIG. 9, when the deflection length of the optical fiber 20 is shortened (L→L1), a bending strength is increased and thus a force for inserting the top end of the optical fiber 20 to remove the coating is increased. Therefore, the removal of the coating 24 can be carried out more surely.

Next, a method of fitting the optical connecting member that is used to fit the optical connector 1 to the coated optical fiber 20 will be explained hereunder.

Figure 10:
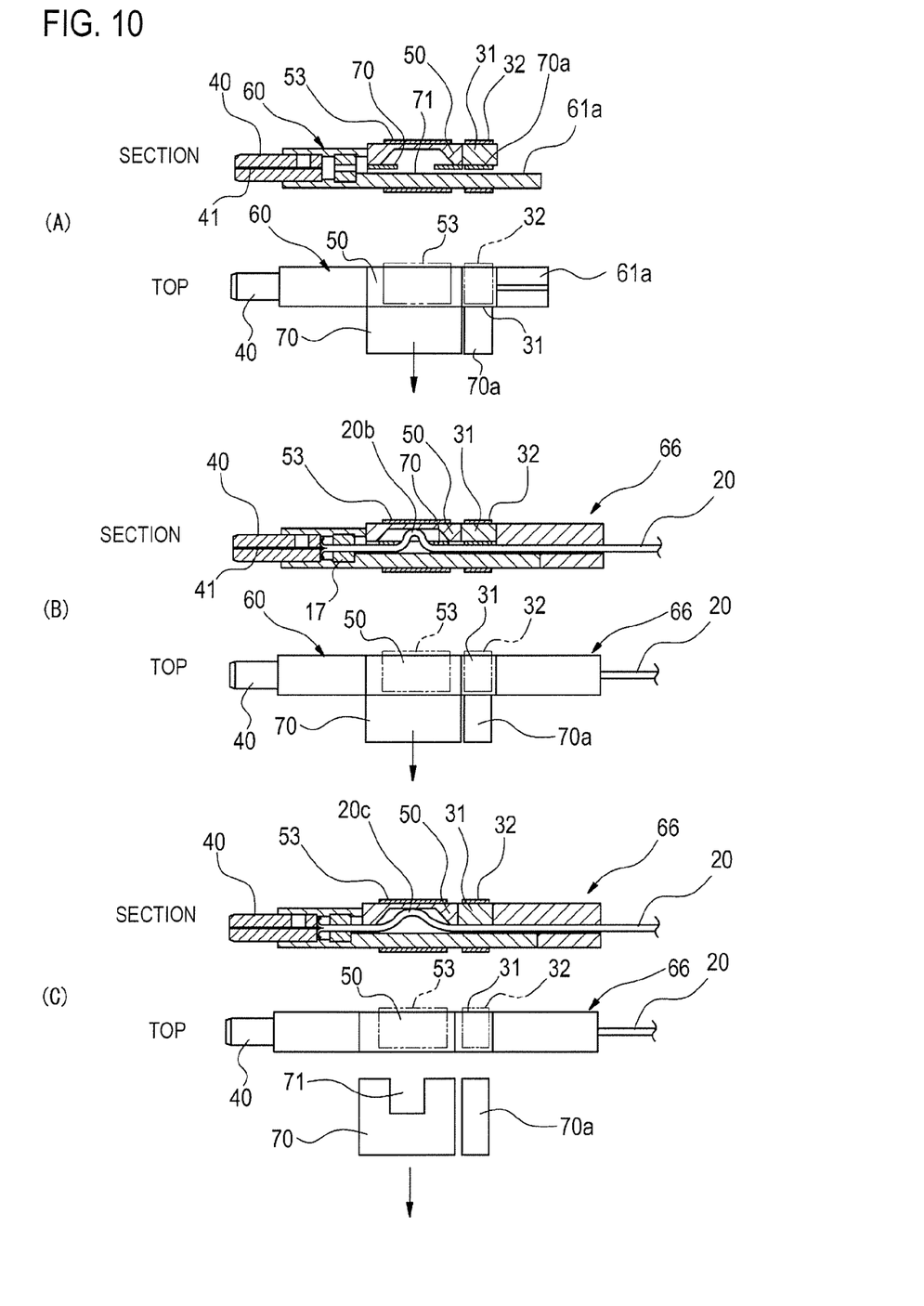
FIG. 10(A) to FIG. 10(C) are explanatory views showing steps of fitting the optical connecting member according to the present invention.

FIG. 10(A) to FIG. 10(C) are explanatory views showing steps of fitting the optical connector to the optical fiber, and show a sectional view taken when viewed from the side and a plan view taken when viewed from the top, respectively.

As shown in FIG. 10(A), first the lid member 50 is clamped by the clamper 53, and then the deflection preventing member 70 is inserted between the lid member 50 and the intermediate face 61a of the base member 60. Accordingly, the recess portion 51 and the V-shaped groove 65 are isolated mutually (i.e., a part of the V-shaped groove 65 is covered) in the front and rear portions of the lid member 50, and thus an insertion path 73 into which the optical fiber 20 is inserted (see FIG. 2) is formed. Also, in the fixing portion 30, similarly the plate-like member 70a is inserted between the lid 31 and the intermediate face 61a to keep the insertion path of the optical fiber 20.

As shown in FIG. 10(B), in this state, the optical fiber 20 being held in the holder 66 is inserted into the V-shaped groove 65 from the rear end, and then the optical fiber 20 is inserted into the guide capillary 17 and positioned in the radial direction, and also the top end face of the optical fiber 20 is pushed against the coating removing portion 10 of the rear end face 40b of the ferrule 40. At this time, the optical fiber 20 can be bent only in the releasing portion 71 being provided in the center of the deflection preventing member 70. Therefore, the top end face of the optical fiber 20 is pushed against the coating removing portion 10 while the optical fiber 20 is bent upward in the releasing portion 71 to form the preliminary deflection 20b. When the optical fiber 20 is pushed against the coating removing portion 10, the coating 24 is stripped off, then only the glass fiber 21 is inserted into the glass fiber insertion hole 42 of the ferrule 40, and then the stripped coating 24 is contained in the space 63. As a result, the glass fiber 21 can be inserted into the glass fiber insertion hole 42 of the ferrule 40 while removing the coating 24 from the top end of the optical fiber 20, and the top end face of the glass fiber 21 can be pushed against the rear end face of the short optical fiber 41 built in the ferrule 40.

Then, as shown in FIG. 10(C), the recess portion 51 of the lid member 50 is opened by pulling out the deflection preventing member 70, and a main deflection 20c is formed by bending the optical fiber 20 in the deflection space 16 over a full range in the insertion direction of the optical fiber 20. In this state, the plate-like member 70a of the fixing portion 30 is pulled out, and the lid 31 and the base member 60 are clamped by the fixed-portion damper 32 and fixed.

Here, when the lid member 50 and the lid 31 of the fixing portion 30 are constructed integrally, the optical fiber 20 can be fixed in the fixing portion 30 simultaneously when the main deflection 20c is formed in the deflection space 16. In this case, the deflection preventing member 70 may be formed integrally with the plate-like member 70a.

According to the optical connecting member and the method of fitting the same explained as above, when the optical connector 1 is fitted onto the optical fiber 20 that has the coating 24 on the outer periphery of the glass fiber 21, the end surface of the optical fiber 20 is pushed against the coating removing portion 10 by inserting the optical fiber 20 into the base member 60. Therefore, not only the coating 24 can be removed easily by an insertion force applied to the optical fiber 20, but also the glass fiber 21 can be inserted into the glass fiber insertion hole 42 of the ferrule 40. As a result, the coated optical fiber 20 can be easily connected to the short optical fiber 41 that is built in the ferrule 40, not to particularly execute the coating removing operation prior to the insertion into the optical connector 1. Also, the coated optical fiber 20 can be positioned on a basis of the outer peripheral face of the glass fiber 21, and therefore a high-precision positioning can be done easily.

Also, upon inserting the optical fiber 20, the deflection preventing member 70 is inserted into the deflection space 16 to shield a part of the deflection space 16. Thus, a length of the preliminary deflection 20b formed in removing the coating is shortened. In other words, the coating removing length L2 as a length of movement necessary for the coating removal is provided to the rear end portion of the optical connector 1, by forming the preliminary deflection 20b of length L1 in the deflection space 16. As a result, the end portion of the optical fiber 20 can be pushed against the coating removing portion 10 by a strong pushing force while preventing the large bending of the coated optical fiber 20 caused in removing the coating, and thus the coating 24 can be removed without fail.

Then, the deflection preventing member 70 is removed after the removal of the coating, and then the optical fiber 20 is fixed by the fixing portion while deflecting the optical fiber 20 in the deflection space 16 (the main deflection 20c). Therefore, the top end of the glass fiber 21 can be pushed against the built-in short optical fiber 41, or the like by a predetermined pushing force, and thus the optical fiber 20 can be connected without fail.

Next, another embodiment of the optical connector as the optical connecting member according to the present invention will be explained hereunder.

Figure 11:
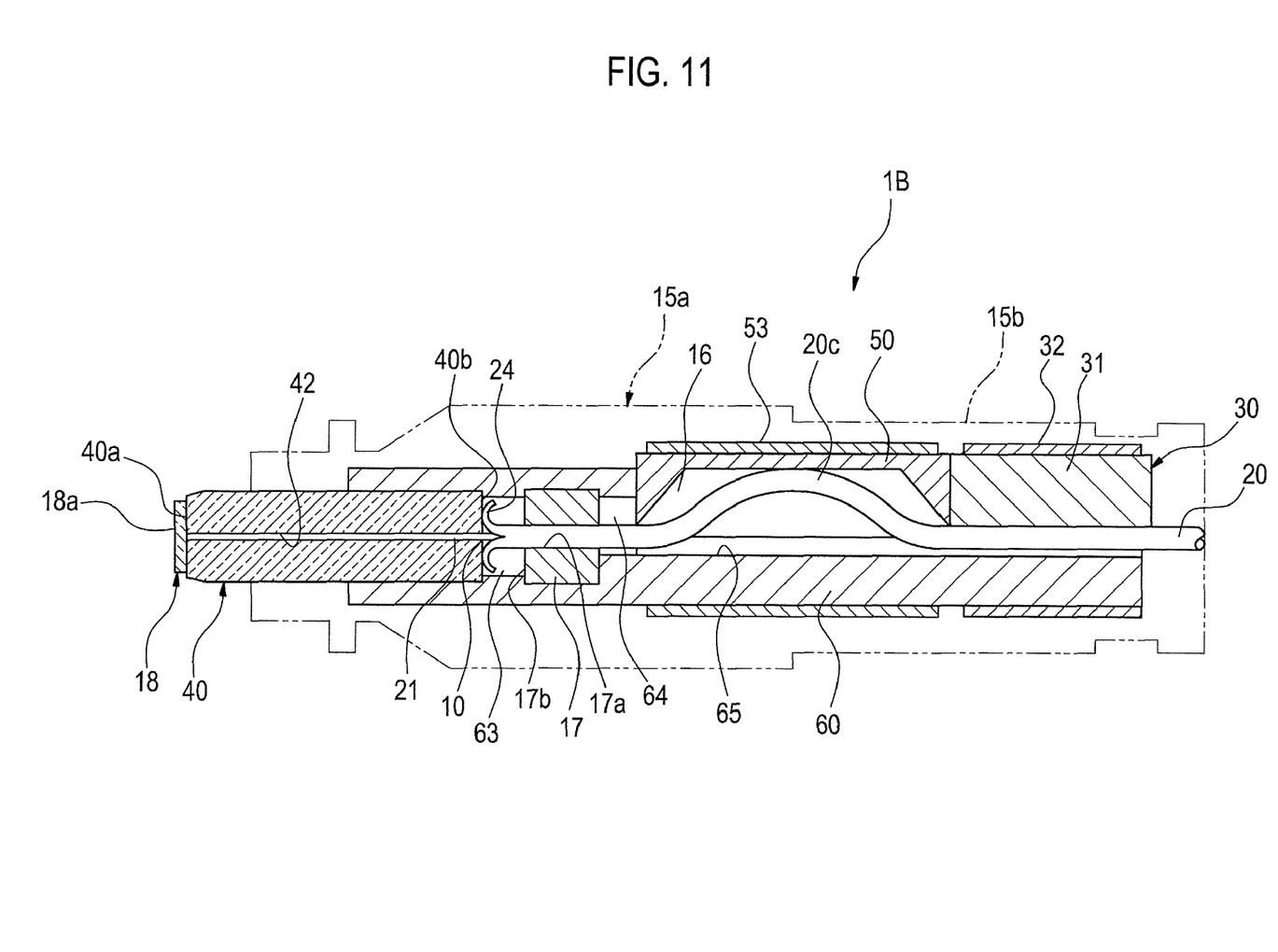
FIG. 11 is a sectional view showing another embodiment of the optical connecting member according to the present invention.

FIG. 11 is a sectional view showing another embodiment of the optical connector. Here, the same reference symbols are affixed to the portions that are common to the optical connector 1 according to the above embodiment, and their redundant explanations will be omitted herein.

As shown in FIG. 11, in an optical connecting member 1B, a thin film 18 as the optical member is provided to the top end face of the ferrule 40 to cover at least the end portion of the glass fiber insertion hole 42. The thin film 18 is a substantial-sheet like protection member that transmits a light at the refractive index that is equal to the core of the optical fiber 20, and is pasted to cover the glass fiber insertion hole 42. Also, the thin film 18 is formed like a sheet of 5 to 30 μm thickness, for example, and an outer side face 18a has no tackiness. Thus, dusts, and the like are hard to adhere.

Therefore, there is no need to provide the glass fiber (the short optical fiber 41) in advance in the glass fiber insertion hole 42 of the ferrule 40. Also, there is no need to provide the notch 43 to the ferrule 40.

According to such configuration, the similar advantages to those of the optical connector 1 according to the above embodiment.

The present invention is explained in detail with reference to the particular embodiments as above. But it is obvious for those skilled in the art that various variations and modifications can be applied without departing from a spirit and a scope of the present invention.

This application is based upon Japanese Patent Application (Patent Application No. 2007-301851) filed on Nov. 21, 2007; the contents of which are incorporated herein by reference.

The invention claimed is:

1. An optical connecting member fitted onto an optical fiber that has a coating on an outer periphery of a glass fiber, comprising:
   a connecting portion with a glass fiber insertion hole;
   a fixing portion for fixing the optical fiber that is inserted into the glass fiber insertion hole;
   a coating removing portion for removing the coating from an end portion of the optical fiber by an insertion force applied the optical fiber to an inner side of the optical connecting member;
   a deflection space provided between the fixing portion and the coating removing portion to contain the optical fiber in a deflected state therein; and
   a detachably attached deflection preventing member for preventing partially a deflection of the optical fiber by shielding a part of the deflection space along an insertion direction of the optical fiber.

2. An optical connecting member according to claim 1, wherein the deflection preventing member covers a guide groove that is provided in the deflection space to pass the optical fiber therethrough.

3. An optical connecting member according to claim 2, wherein a releasing portion, which allows the optical fiber inserted into the deflection space to deflect, is provided to the deflection preventing member in an intermediate portion in an insertion direction of the optical fiber.

4. An optical connecting member fitting method of fitting the optical connecting member set forth in claim 1 to an optical fiber, comprising:
   forming an insertion path of the optical fiber in a state that the deflection space is shielded partially by the deflection preventing member;
   inserting the optical fiber into the insertion path in the optical connecting member;
   pushing further the optical fiber by pushing a top end of the inserted optical fiber against the coating removing portion such that the optical fiber is deflected at a part of the insertion direction of the optical fiber in the deflection space and also a coating of the top end of the optical fiber is removed by the coating removing portion and then the glass fiber is inserted into the glass fiber insertion hole; and
   pulling out the deflection preventing member from the deflection space, then causing the optical fiber to bend in a full range in the insertion direction of the optical fiber in the deflection space, and then fixing the optical fiber by the fixing portion.

* * * * *

UNITED STATES PATENT AND TRADEMARK OFFICE
CERTIFICATE OF CORRECTION

PATENT NO. : 8,292,514 B2  
APPLICATION NO. : 12/744202  
DATED : October 23, 2012  
INVENTOR(S) : Kenichiro Ohtsuka et al.

Page 1 of 1

It is certified that error appears in the above-identified patent and that said Letters Patent is hereby corrected as shown below:

Title page, please add one more Assignee to (73) Sumitomo Electric Industries, Ltd., Osaka (JP)

Should read

-- (73) Sumitomo Electric Industries, Ltd., Osaka (JP)
      Nippon Telegraph and Telephone Corporation, Tokyo (JP) --

Signed and Sealed this
Eighth Day of January, 2013

David J. Kappos
*Director of the United States Patent and Trademark Office*